May 15, 1951 E. MONTEY 2,552,994
MACHINE FOR SHARPENING LAWN MOWERS
Filed Sept. 6, 1949 4 Sheets-Sheet 1
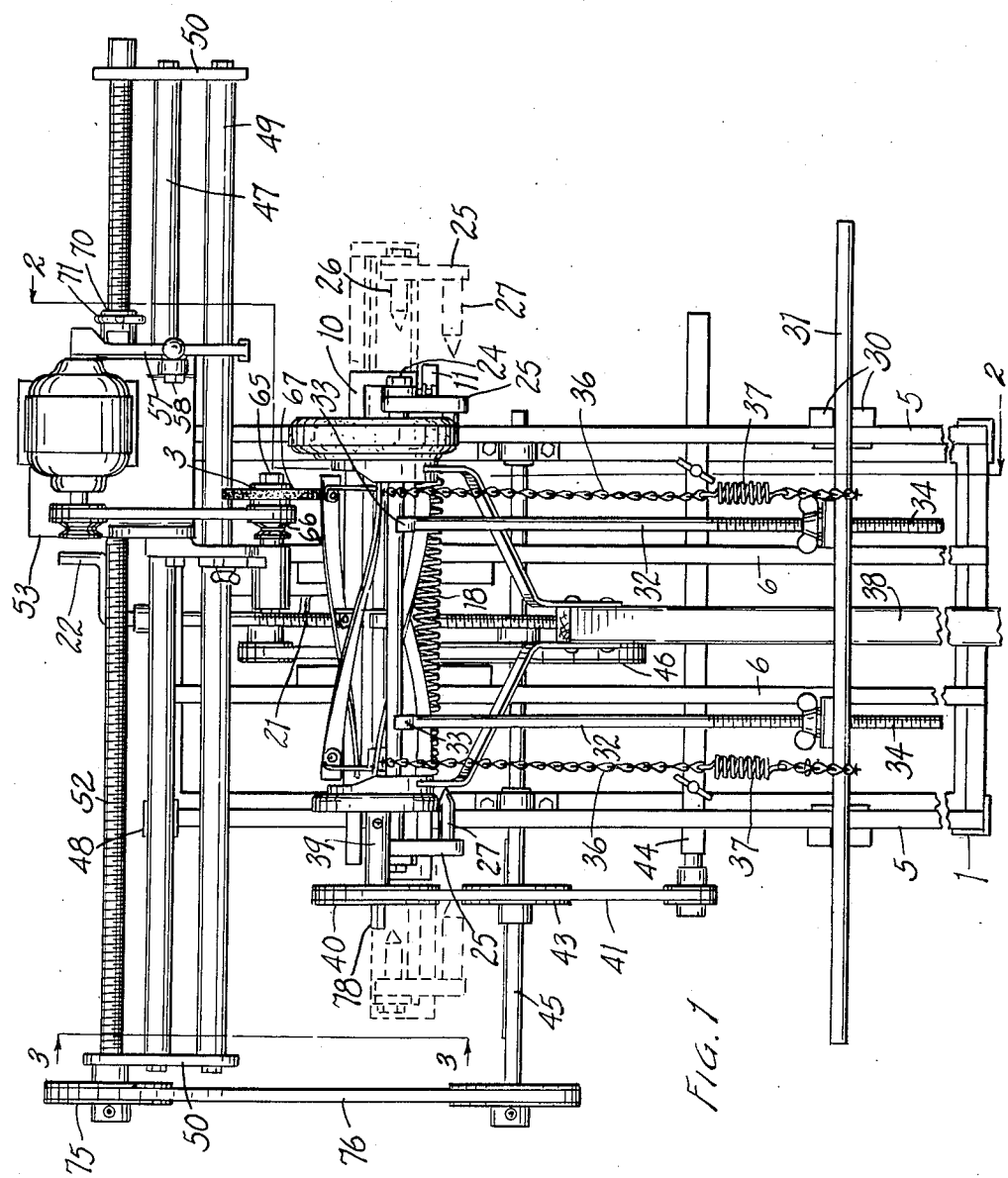
FIG. 1
INVENTOR.
Emanuel Montey
BY
Attorney.

INVENTOR.
Emanuel Montey
BY Omar Earl
Attorney.

May 15, 1951 E. MONTEY 2,552,994
MACHINE FOR SHARPENING LAWN MOWERS
Filed Sept. 6, 1949 4 Sheets-Sheet 3

INVENTOR.
Emanuel Montey
By Otwa Earl
Attorney.

May 15, 1951      E. MONTEY      2,552,994
MACHINE FOR SHARPENING LAWN MOWERS
Filed Sept. 6, 1949      4 Sheets—Sheet 4
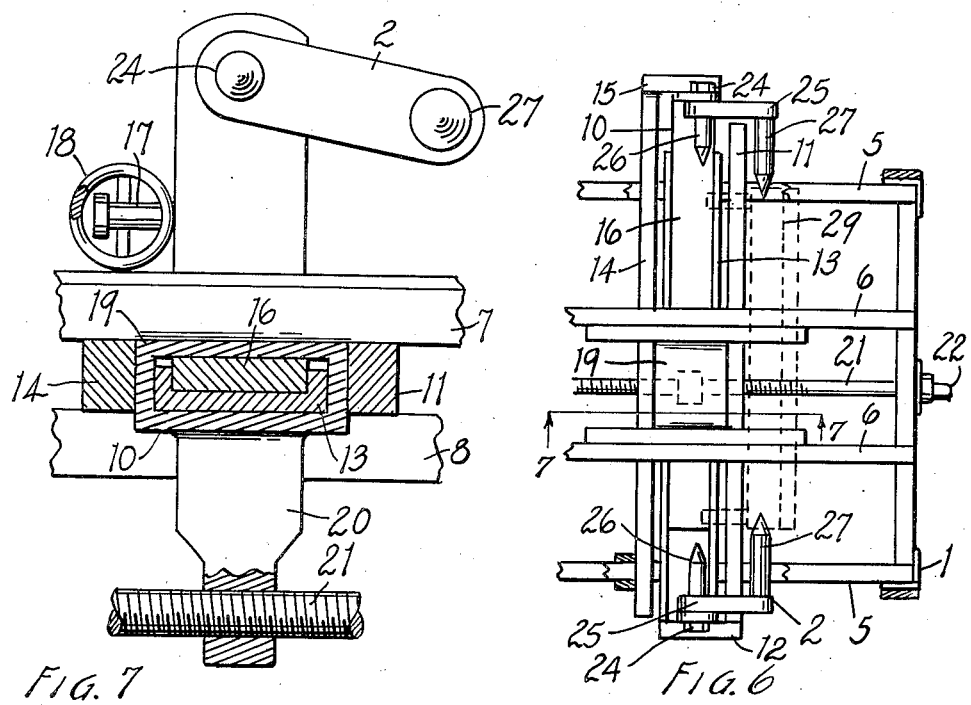
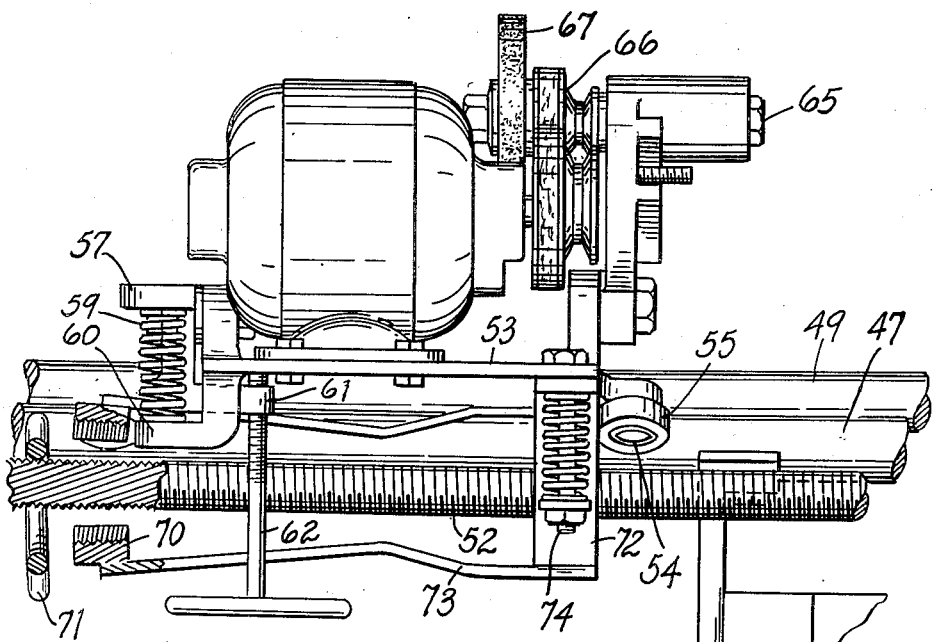
INVENTOR.
Emanuel Montey
By Otis A. Earl
Attorney Patented May 15, 1951

2,552,994

UNITED STATES PATENT OFFICE 2,552,994

MACHINE FOR SHARPENING LAWN MOWERS

Emanuel Montey, Benton Harbor, Mich.

Application September 6, 1949, Serial No. 114,220

8 Claims. (Cl. 51—34)

1

This invention relates to improvements in a machine for sharpening lawn mowers.

The principal objects of this invention are:

First, to provide a machine for sharpening both the rotating blades and the cutter bar of lawn mowers.

Second, to provide a machine which is adjustable to receive various sizes and styles of lawn mowers.

Third, to provide a machine which will cylinder grind and clearance grind the rotating blades of a lawn mower without dismantling the blades from the frame of the mower.

Fourth, to provide a machine with adjustable work holding elements which are selectively movable to support either the frame or the cutter bar of various types of lawn mowers in position to be sharpened by an automatically advanced grinding wheel.

Fifth to provide a machine having driving mechanism for rotating the spiral blades of a lawn mower and for automatically advancing an independently driven grinding wheel along the surface swept by the blades.

Other objects and advantages relating to details of my machine will be apparent from a consideration of the following description and claims. The drawings of which there are four sheets illustrate a preferred form of my machine.

Fig. 1 is a plan view of the machine with a domestic type lawn mower mounted thereon for having its blades cylinder ground.

Fig. 5 is an end elevational view partially broken away in vertical cross section of the structure for mounting and advancing the grinding wheel and motor on the machine.

Fig. 6 is a fragmentary plan view of the work supporting structure of the machine.

Fig. 7 is a fragmentary vertical cross sectional view taken along the plane of the line 7—7 in Fig. 6.

Figure 2:
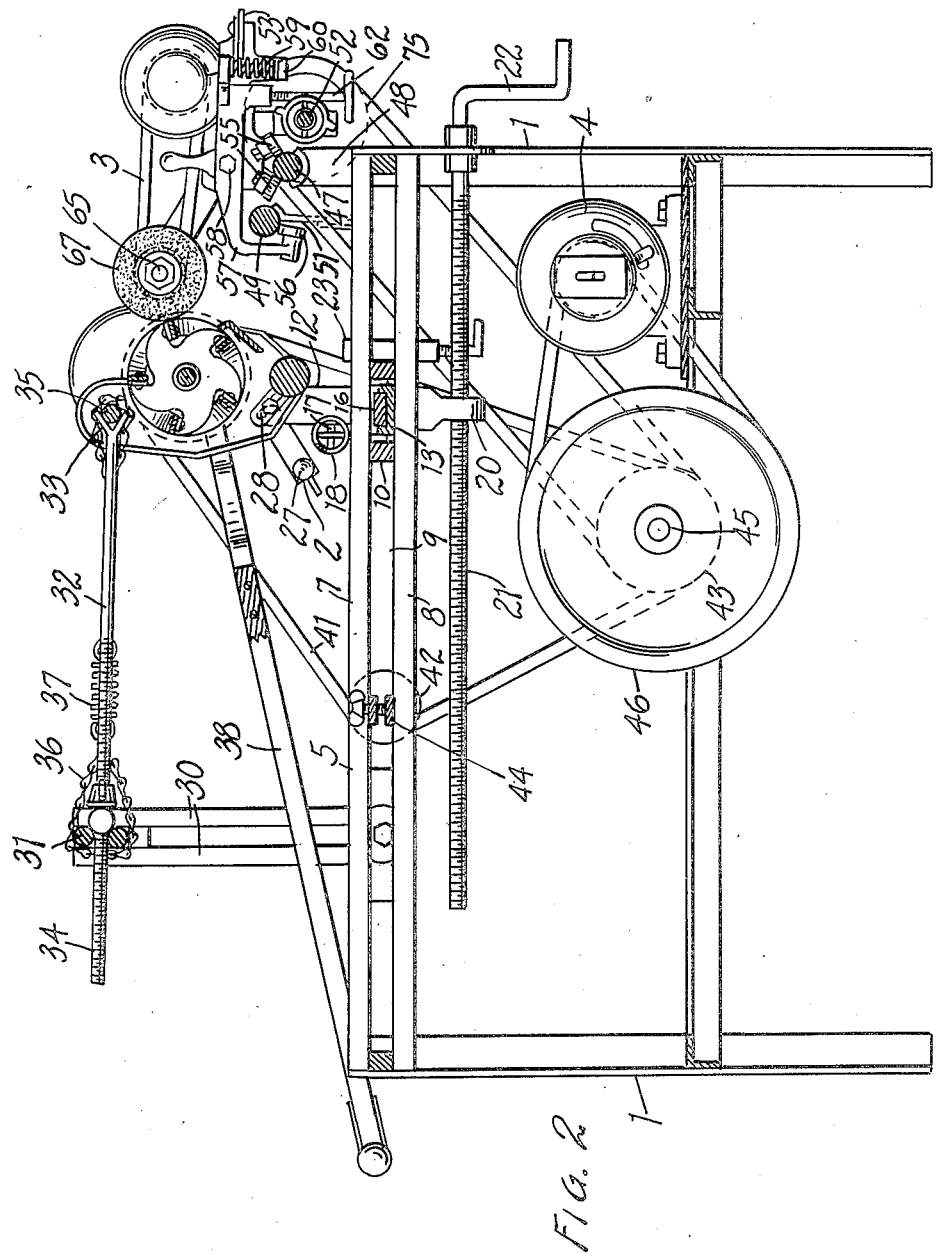
Fig. 2 is a vertical cross sectional view through the machine and lawn mower taken along the plane of the line 2—2 in Fig. 1.

It is well known that the common domestic type of lawn mower must be sharpened at intervals to maintain the edges of its spiral blades

2 along a cylindrical surface. Grinding the blades to provide this surface is known as cylinder grinding the blades. After being cylinder ground the blades must be cut back or beveled in an operation known as clearance grinding and the stationary cutter bar with which the spiral blades cooperate must also be ground to a straight sharp edge. My machine provides first, a work supporting structure which is adjustable for engaging a wide variety of sizes and styles of domestic lawn mowers and their cutter bars in a position where the necessary grinding operations can be performed. Further my machine provides an adjustably mounted and automatically advanced grinding wheel for performing the several grinding operations. The machine comprises generally a table-like framework 1 having the work supporting structure mounted thereon as is generally indicated at 2. The grinding mechanism generally indicated at 3 is mounted on one end of the framework and a motor 4 for advancing the grinder and rotating the spiral blades is mounted on a lower shelf of the framework.

Considering first the details of the mechanism for supporting the lawn mower on the machine it will be noted that the table or framework is provided with longitudinally extending side rails 5 and intermediate or center rails 6. The rails 5 and 6 are of two piece construction having spaced upper bars 7 and lower bars 8 which provide slideways 9 therebetween.

Adjustably positioned along the side rails 5 and extending transversely through the slideways 9 is a telescopic bar structure indicated in its entirety at 10. One end of the bar structure 10 consists of an outer bar 11 joined by an end plate 12 with a channel shaped plate 13. The other bar consists of an outer bar 14 positioned on the opposite side of the channel plate from the first bar 11 and joined at its end by the plate 15 with a flat slide plate 16 slideably received within the channel plate 13. The end plates 12 and 15 are provided with upstanding arms supporting projecting pins 17 to which the ends of a tension spring 18 are connected to constantly draw the two sections of the bar 10 together.

Positioned between the center rails 6 is a rectangular sleeve 19 which embraces the slide plate 16 and channel plate 13. The sleeve 19 is provided with a depending ear 20 which threadingly engages the adjusting screw 21. One end of the screw 21 is axially fixed to the end of the framework 1 and provided with a crank 22 by means of which the sleeve 19 and bar structure 10 may be adjusted longitudinally of the slideways 9.

When the work supporting bar structure 10 has been located in the proper longitudinal position and the end plates 12 and 15 thereof have been pulled apart to the desired spacing, the bar assembly 10 can be clamped in position by means of the screw clamps 23 which compresses the upper and lower bars of one side rail to grip the bar assembly 10.

Figure 4:
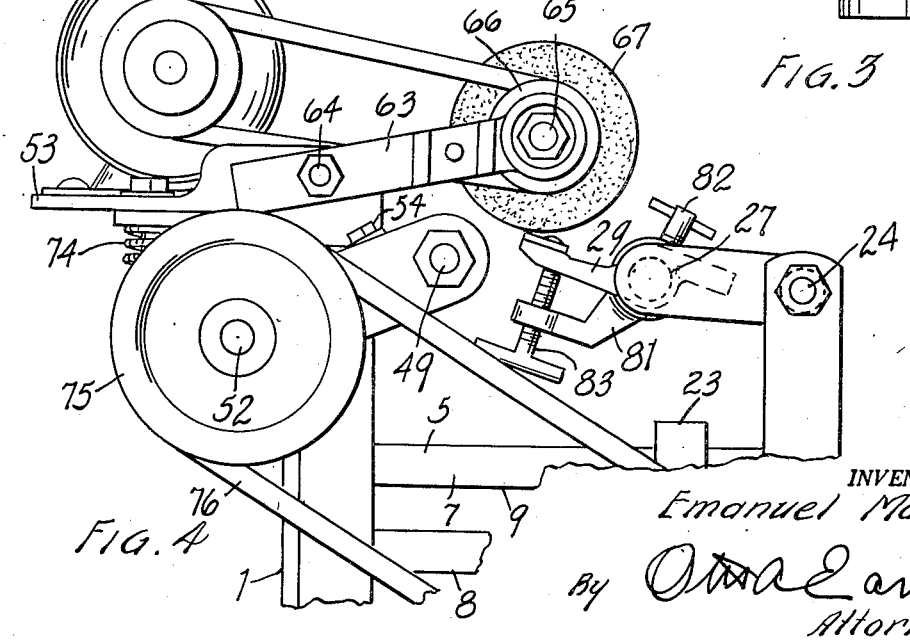
Fig. 4 is a fragmentary side elevational view illustrating the machine with the cutter bar of the lawn mower mounted thereon.

The upstanding arms on the end plates 12 and 15 of the bar structure are provided at their upper ends with screws 24 adjustably clamping the support brackets 25 to the end arms. The brackets 25 each carry inwardly extending short pins 26 coaxial with the screws 24, and longer pins 27 offset from the pins 26. The pins 26 are adapted to be engaged in slots or other locating depressions in the framework of the lawn mower to be sharpened as is best indicated at 28 in Fig. 2. The pins 27 are adapted to be swung toward the grinder to engage the ends of the cutter bar of a mower as indicated at 29 in Figs. 4 and 6.

Since the pins 26 will provide only a two point support for the framework of a lawn mower I provide uprights 30 on each side of the framework and connect the uprights with a cross bar 31. The cross bar 31 defines a slot or opening through which I extend the longitudinal struts or brace rods 32 having forked inner ends 33 and threaded outer ends 34. The forks 33 are adapted to receive and engage the tie bar or other cross piece of the mower as indicated at 35. Chains 36 having spring inserts 37 are provided for drawing the tie bar securely into the forks. The mower is thus adjustably supported in any desired position on the machine with the spiral blades facing the grinder 3. Note that the handle 38 of the mower need not be removed and that a wide variety of shapes and sizes of mowers can thus be accommodated on the machine.

In order to rotate the spiral blades of the mower while it is supported on the machine, I remove one wheel of the lawn mower thus exposing the shaft of the spiral blades and secure a shaft extension to the blade shaft as at 39 in Fig. 1. The shaft extension 39 which may be provided in a variety of forms for fitting different lawn mower shafts also carries a pulley 40 around which the belt 41 is trained. The belt 41 is trained around an idler pulley 42 and a drive pulley 43 positioned adjacent to the driving motor 4. The idler pulley 42 is mounted on a cross bar 44 extending through and adjustable along the slideways 9 so that the belt 41 can be easily fitted to different styles of mowers. The pulley 43 is mounted on cross shaft 45 journaled on the lower shelf of the framework and is driven from the motor 4 by means of a speed reducing pulley 46.

The structure for supporting the grinding wheel and motor 3 consists of a first cross rod 47 fixedly secured to the end uprights or legs 48 of the framework 1. A second cross rod of circular cross section 49 is joined to the ends of the first cross rod by a pair of straps 50 and is further attached to the side rails 5 of the frame by the brackets 51. The straps 50 extend outwardly of the first cross rod 47 and rotatably support the transverse feed screw 52.

The cross rods 47 and 49 form guides or slideways for a motor support plate 53. The inner edge of the support plate carries the downwardly diverging pins 54 on which the rollers 55 are mounted for rolling engagement with the first cross rod 47. The motor support plate 53 is restrained against tilting about the first cross rod by means of a roller 56 engaging the under side of the second cross rod 49 (see Fig. 2). The roller 56 is carried on an arm 57 pivotally secured to the motor support plate 53 by the screw 58. The outer end of the arm 57 is biased upwardly from the motor support plate by the upper end of the spring 59 bearing against an ear 60 projecting from the plate 53. The motor support plate and grinder is thus yieldably restrained for tilting about the cross bar 47. In order to adjust the inclination of the plate 53, the outer end of the arm 57 is provided with a transversely extending finger 61 through which the adjusting screw 62 extends for engagement with the under side of the motor support plate 53.

The opposite side of the motor support plate 53 from the balancing arm 57 is provided with a wheel arm 63 which is pivotally secured to the motor support plate at 64, the inner end of the arm 63 carries the grinder shaft 65 on which a pulley 66 and the grinding wheel 67 are mounted. The arm 63 and grinding wheel 67 are steadied with respect to the cross rod 47 by means of the roller 68 carried by the arm 69 and adjustably secured to the grinding wheel support arm 63.

The motor support plate 53 and the grinding wheel 67 are moved transversely along the rods 47 and 49 by means of a split nut 70 which is selectively engageable with the transverse feed screw 52 by a removable clamp ring 71. The two halves of the split nut 70 are individually secured to a bracket 72 by the spring arms 73 and the bracket 72 is in turn yieldably secured to the motor support plate 53 by the spring loaded bolt 74.

In order to rotate the transverse feed screw 52, the screw is provided with a pulley 75 connected by means of the belt 76 to a pulley on the cross shaft 45. By means of the driving connections thus far described it is possble to rotate the spiral blades of the mower while simultaneously advancing the grinding wheel transversely of the machine along the edges of the blade. During this operation the grinding wheel is adjusted by means of the arm 63 to cylinder grind the spiral blades as shown in Fig. 2.

Figure 3:
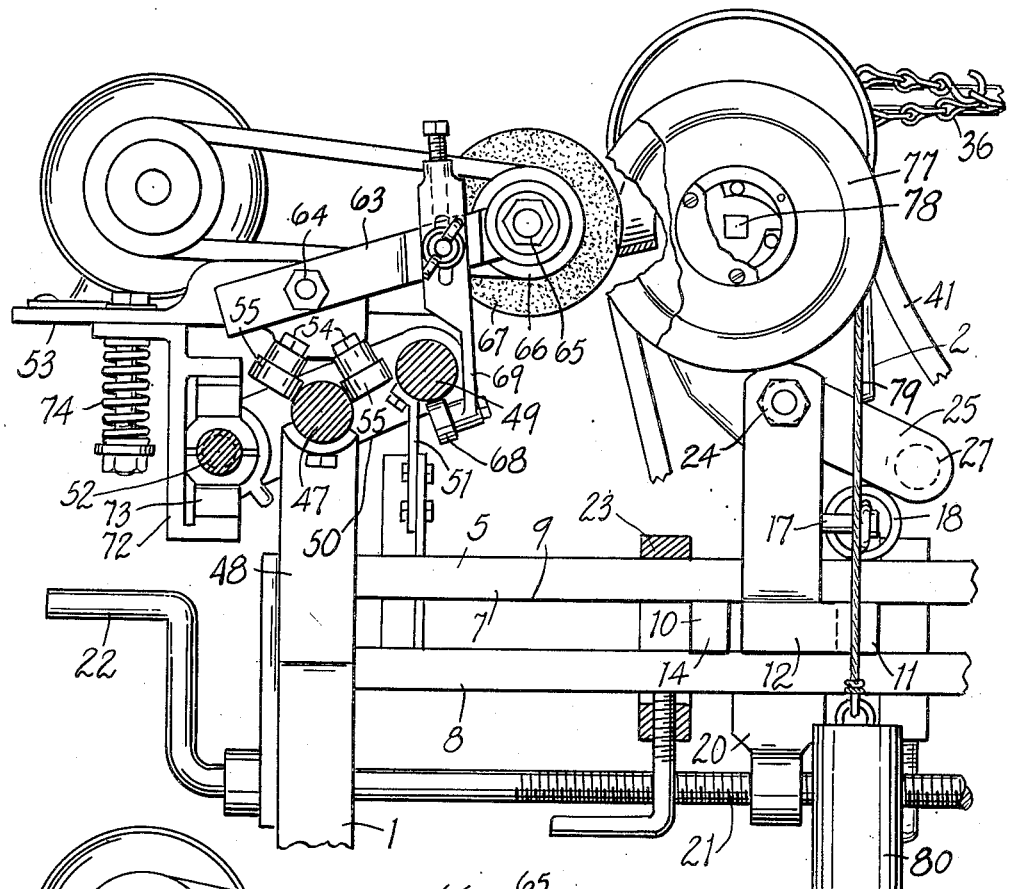
Fig. 3 is a fragmentary enlarged cross sectional view taken along the plane of the line 3—3 in Fig. 1 and showing the machine and lawn mower arranged for clearance grinding the blades of the mower.

After the spiral blades have been cylinder ground the belt 41 for rotating the spiral blades is disconnected and the grinding wheel 67 is readjusted as indicated in Fig. 3 to bevel or clearance cut the blades. A removable pulley 77 is then installed on the squared end 78 of the shaft adapter 39 and a rope or cord 79 having a weight 80 on its end is wrapped around the pulley. The grinding motor and wheel is returned to its starting position at one side of the blades and the rope and weight are permitted to rotate one of the spiral blades into grinding engagement with the grinding wheel. Both the feed motor 4 and the grinding motor are then started and the grinding wheel will be advanced transversely of the spiral blade with the blade following the grinding wheel under the influence of the weight 80. This latter operation is of course repeated for each of the spiral blades.

The cutter bar 29 of the mower must be removed for sharpening and is mounted between the pins 27 with its edge presented to the grinding wheel. A steady rest 81 is slipped over the pin 27 and secured in place by the screw 82 to support the cutter bar 29 (see Fig. 4). The screw 83 on the steady rest holds the edge of the cutter blade to the desired grinding position. As in grinding the spiral blades the grinding wheel is caused to move transversely across the cutter bar by operation of the feed motor 4 and the feed screw 52.

Having thus described my invention what I claim as new and desire to secure by Letters Patent is:

1. A machine for grinding the spiral blades of a lawn mower comprising, a framework having longitudinally extending side rails forming slideways, a transverse extensible bar mounted in said slideways and having mower supporting arms extending vertically from its ends, brackets having rotatably adjustable connections to said arms and having inwardly extending work engaging pins, screw means for adjusting said extensible bar longitudinally of said slideways, said pins projecting inwardly from said arms being adapted to engage the framework of a mower, a support projecting vertically above said side rails, axially adjustable brace rods secured to said support for securing the framework of the mower engaged with said pins to said support, a shaft extension having a pulley thereon and adapted to be secured to the spiral blade shaft of the mower, means including an adjustably mounted idler pulley, a belt and feed motor for rotating said first pulley, a pair of round rods forming transversely extending ways on the opposite end of said framework from said support, a grinding head comprising a base, a grinding wheel and grinder motor tiltably mounted on one of said rods with the grinding wheel opposed to the mower, a transverse feed screw mounted adjacent to said transverse ways and having a driving connection to said feed motor, means including a split nut for selectively engaging said transverse feed screw to said grinding head, an arm pivoted on said base and having a roller engageable with the other of said rods, and a screw engaged between said last arm and said base for angularly adjusting said arm and base to tiltably adjust said base on said ways.

2. A machine for grinding the spiral blades of a lawn mower comprising, a framework having longitudinally extending side rails forming slideways, a transverse extensible bar mounted in said slideways and having work supporting arms on its ends, means for adjusting said transversely extensible bar longitudinally of said slideways, mower engaging pins projecting inwardly from said arms on said transverse bar and adapted to engage the framework of a mower, a support projecting upwardly from said side rails, means for securing the framework of the mower engaged with said pins to said support, a shaft extension having a pulley thereon and adapted to be secured to the spiral blade shaft of the mower, means including an adjustably mounted idler pulley, a belt and feed motor for rotating said first pulley, a pair of round rods forming transversely extending ways on said framework, a grinding head comprising a base, a grinding wheel and grinder motor tiltably adjustably mounted on said ways with the grinding wheel opposed to the mower, a transverse feed screw mounted adjacent to said ways and having a driving connection to said feed motor, means including a split nut for selectively engaging said transverse feed screw to said base, and an arm tiltably connected to said base and adjustably supporting said grinding wheel thereon.

3. A machine for grinding the spiral blades of a lawn mower comprising, a framework having longitudinally extending side rails forming slideways, a transverse extensible bar mounted in said slideways and having work supporting arms on its ends, means for adjusting said transversely extensible bar longitudinally of said slideways, mower engaging pins projecting inwardly from said arms on said transverse bar and adapted to engage the framework of a mower, a support projecting from said side rails, means for securing the framework of the mower engaged with said pins to said support, a shaft extension having a pulley thereon and adapted to be secured to the spiral blade shaft of the mower, means including an adjustably mounted idler pulley, a belt and feed motor for rotating said first pulley, transversely extending ways on said framework, a grinding head comprising a base, a grinding wheel and grinder motor mounted on said ways with the grinding wheel opposed to the mower, a transverse feed screw mounted adjacent to said ways and having a driving connection to said feed motor, means including a split nut for selectively engaging said transverse feed screw to said base, and an arm tiltably connected to said base and adjustably supporting said grinding wheel thereon.

4. A machine for sharpening lawn mowers comprising, a boxlike framework having upper and lower longitudinal side members and having a work feeding motor mounted on said lower side members, transversely extending ways mounted above one end of said framework, a transverse feed screw rotatably mounted adjacent to said ways and drivingly connected to said motor, a carriage reciprocably mounted on said ways, adjutable means for tilting said carriage on said ways and longitudinally of said framework, releasable means including a split nut engageable with said feed screw and yieldably connected to said carriage for advancing said carriage along said ways, a grinder motor mounted on said carriage, an arm adjustably connected to said carriage and extending longitudinally of said framework, a grinding wheel carried by said arm and drivingly connected to said grinding motor, longitudinally extending rails on said framework forming longitudinal slideways along said upper longitudinal members, a transversely extending work support slidable in said slideways and including a transversely extensible bar having mower supporting arms projecting from its ends, means on said arms adapted to engage the framework of a mower therebetween and support the mower with its blades presented to said grinding wheel, means for securing said work support in longitudinally adjusted position, and means including a belt and pulley for drivingly connecting the blades of a mower mounted in said support to said feeding motor, said pulley being adjustably secured to said framework whereby said belt is adapted to mowers of various sizes.

5. A machine for sharpening lawn mowers comprising, a boxlike framework having upper and lower longitudinal side members and having a work feeding motor mounted on said lower side members, transversely extending ways mounted above one end of said framework, a transverse feed screw rotatably mounted adjacent to said ways and drivingly connected to said motor, a carriage reciprocably mounted on said ways, adjustable means for tilting said carriage on said ways and longitudinally of said framework, releasable means including a split nut engageable with said feed screw and yieldably connected to said carriage for advancing said carriage along said ways, a grinder motor mounted on said carriage, an arm adjustably connected to said carriage and extending longitudinally of said framework, a grinding wheel carried by said arm and drivingly connected to said grinding motor, longitudinally extending rails on said framework forming longitudinal slideways, a transversely extending work support slidable in said slideways and having arms projecting from its ends, means on said arms adapted to engage the framework of a mower and support the mower with its blades presented to said grinding wheel, means for securing said work support in longitudinally adjusted position, and means including a belt and pulley for drivingly connecting the blades of a mower in said support to said feeding motor, said pulley being adjustably secured to said framework whereby said belt is adapted to mowers of various sizes.

6. A machine for sharpening lawn mowers comprising, a framework having a work feeding motor mounted thereon, transversely extending ways mounted above one end of said framework, a transverse feed screw rotatably mounted adjacent to said ways and drivingly connected to said motor, a carriage reciprocably mounted on said ways, adjustable means for tilting said carriage on said ways and longitudinally of said framework, releasable means including a split nut engageable with said feed screw and yieldably connected to said carriage for advancing said carriage along said ways, a grinder motor mounted on said carriage, an arm adjustably connected to said carriage and extending longitudinally of said framework, a grinding wheel carried by said arm and drivingly connected to said grinding motor, longitudinally extending rails on said framework, a transversely extending work support slidable on said rails and including a transversely extensible bar, means on the ends of said bar adapted to engage the framework of a mower therebetween and support the mower with its blades presented to said grinding wheel, and means including a belt and pulley for drivingly connecting the blades of the mower to said feeding motor, said pulley being adjustably secured to said framework whereby said belt is adaptable to mowers of various sizes.

7. A machine for sharpening lawn mowers comprising, a framework having a work feeding motor mounted thereon, transversely extending ways mounted above one end of said framework, a transverse feed screw rotatably mounted adjacent to said ways and drivingly connected to said motor, a carriage reciprocably mounted on said ways, releasable means engageable with said feed screw and connected to said carriage for advancing said carriage along said ways, a grinder motor mounted on said carriage, a grinding wheel carried by said carriage and drivingly connected to said grinding motor, longitudinally extending rails on said framework, a transversely extending work support slidable on said rails and including a transversely extensible bar, means on the ends of said bar adapted to engage the framework of a mower therebetween and support the mower with its blades presented to said grinding wheel, and means including a belt and pulley for drivingly connecting the blades of the mower to said feeding motor, said pulley being adjustably secured to said framework whereby said belt is adaptable to mowers of various sizes.

8. A machine for sharpening lawn mowers comprising, a framework having a work feeding motor mounted thereon, transversely extending ways mounted at one end of said framework, a transverse feed screw rotatably mounted adjacent to said ways and drivingly connected to said motor, a carriage reciprocably mounted on said ways, releasable means engageable with said feed screw and connected to said carriage for advancing said carriage along said ways, a grinder motor mounted on said carriage, a grinding wheel drivingly connected to said grinding motor and mounted on said carriage for tilting relative to said framework, a transversely extending work support slidable longitudinally on said framework and including transversely extensible means adapted to engage the framework of a mower therebetween and support the mower with its blades presented to said grinding wheel, means for securing said work support in adjusted position, and means including a belt and pulley for drivingly connecting the blades of a mower to said feeding motor, said pulley being adjustably secured to said framework whereby said belt is adaptable to mowers of various sizes.

EMANUEL MONTEY.

REFERENCES CITED

The following references are of record in the file of this patent:

UNITED STATES PATENTS

| Number | Name | Date |
|---|---|---|
| 556,868 | Schureman | Mar. 24, 1896 |
| 830,550 | Wilhelmi | Sept. 11, 1906 |
| 908,142 | Root | Dec. 29, 1908 |
| 1,199,949 | Washburn | Oct. 3, 1916 |
| 1,389,588 | Klay | Sept. 6, 1921 |
| 1,409,641 | Anderson | Mar. 14, 1922 |
| 1,605,890 | Brown | Nov. 2, 1926 |
| 1,657,757 | Krenz | Jan. 31, 1928 |
| 1,820,777 | Calhoun | Aug. 25, 1931 |
| 1,967,118 | Glasgow | July 17, 1934 |
| 2,142,669 | Carpenter | Jan. 3, 1939 |
| 2,149,774 | Ingleman | Mar. 7, 1939 |